(12) United States Patent
Lopacki

(10) Patent No.: US 6,637,549 B1
(45) Date of Patent: Oct. 28, 2003

(54) MOBILE OBSERVATION PLATFORM ASSEMBLY

(75) Inventor: Edwin Francis Lopacki, Tuscaloosa, AL (US)

(73) Assignee: Mary Ann Lopacki, Tuscaloosa, AL (US)

( * ) Notice: Subject to any disclaimer, the term of this patent is extended or adjusted under 35 U.S.C. 154(b) by 0 days.

(21) Appl. No.: 10/003,891

(22) Filed: Oct. 25, 2001

(51) Int. Cl.[7] .............................................. A01M 31/02
(52) U.S. Cl. ....................... 182/127; 182/63.1; 182/115
(58) Field of Search ................................ 182/127, 63.1, 182/115, 69.6, 129

(56) References Cited

U.S. PATENT DOCUMENTS

| | | | | |
|---|---|---|---|---|
| 4,787,477 A | * | 11/1988 | Dolan | 182/116 |
| 4,800,986 A | * | 1/1989 | Hayes, III | 182/18 |
| 5,042,614 A | * | 8/1991 | Rainey | 182/22 |
| 5,409,081 A | * | 4/1995 | Reeves | 182/63.1 |
| 5,927,435 A | * | 7/1999 | Benton | 182/116 |
| 6,416,108 B1 | * | 7/2002 | Elswick | 296/96.21 |
| 6,431,314 B1 | * | 8/2002 | Boulanger et al. | 182/63.1 |

* cited by examiner

Primary Examiner—Alvin Chin-Shue
(74) Attorney, Agent, or Firm—Smith, Gambrell & Russell, LLP

(57) ABSTRACT

A mobile observation stand assembly includes a platform that may be in a lowered position for transport and an elevated position for use in a desired location. The assembly includes a base supported by a wheel and axle assembly, with an articulated anterior frame and an articulated posterior frame attached to the base. The posterior and anterior frames each include a basal frame and a principal frame that are jointed by a rollover lock joint that allows for pivotal movement. A leveraging cam is attached to the posterior frame, with the cam supporting the anterior frame during repositioning of the assembly.

18 Claims, 16 Drawing Sheets

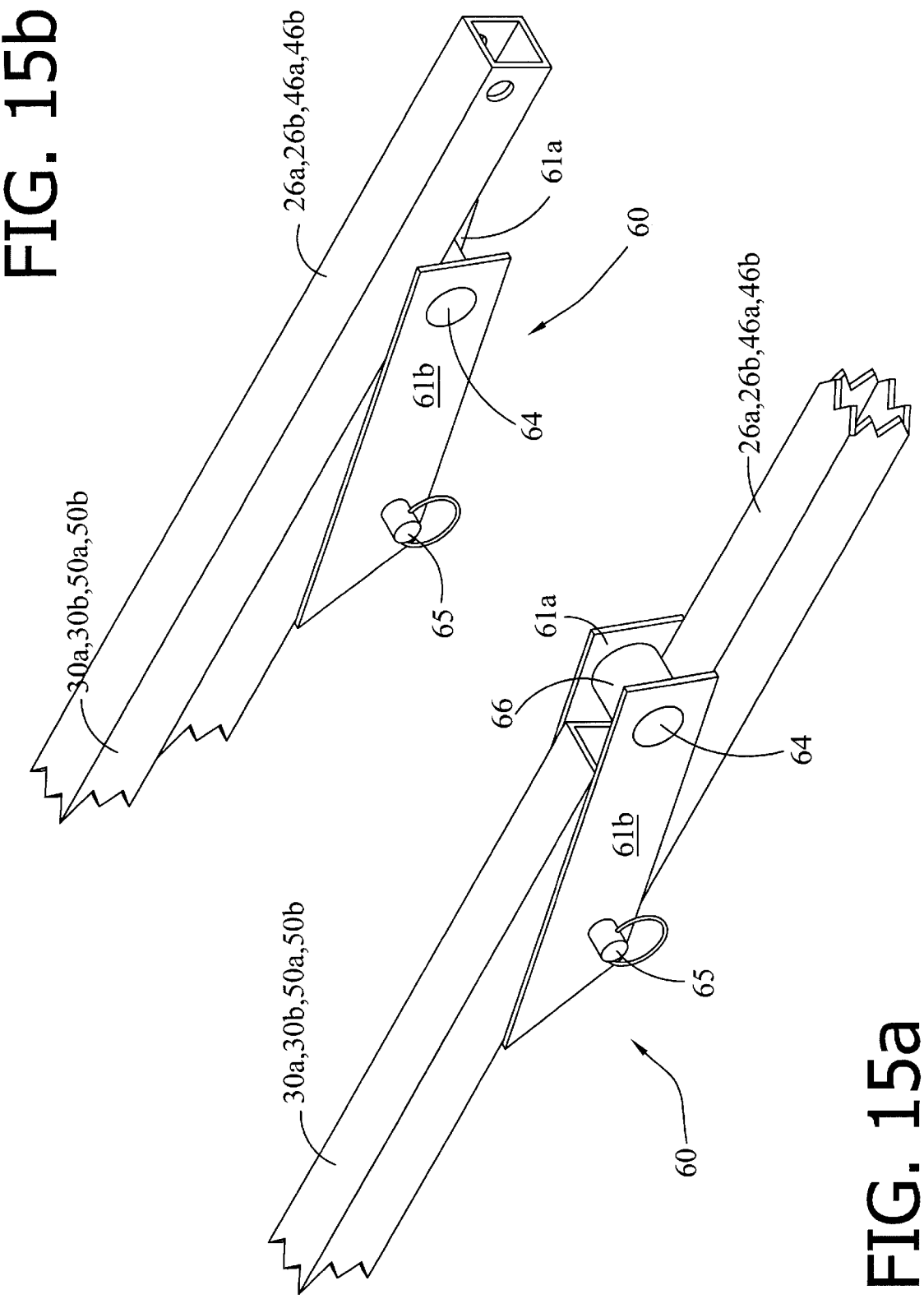

MOBILE OBSERVATION PLATFORM ASSEMBLY

FIELD OF THE INVENTION

The present invention generally relates to the field of portable stands, and more particularly the present invention relates to an articulated observation or hunting stand that is easily transported to a desired location as preferred by the user, and that may be extended and retracted manually by one user with relative ease.

BACKGROUND OF THE INVENTION

Standard observation stands traditionally include a platform which is raised substantially from the ground and which may serve multiple purposes. Such observation stands may be used as a hiding place and surveillance platform for wildlife spectators or hunters, as a post for general observation, as a guard or supervisory tower by the police, army, or related parties, or as a platform for various other public events.

Multiple designs for observation stands of this type are commonly known. Such stands are typically quite complex and made of heavy materials that are difficult to assemble and cumbersome to move. Many observation stands further require manual help to move about, and can therefore be nuisances if the observation stand has to be moved in natural terrain where conventional transportation means do not exist. Moreover, many current observations stands are not freestanding, but in fact require a vertical beam or other vertical surface (such as a tree or a wall) in order to securely stand upright.

What is desired, then, and not found in the prior art, is a mobile observation stand that is easily transported to a desired station and that is easily repositioned between a collapsed and retracted position and an extended position in which the observation platform assembly is freestanding in a relatively high elevated position for the user or users.

SUMMARY OF THE INVENTION

An object of the present invention is to provide an observation platform assembly that is mobile.

An object of the present invention is to provide an articulated observation platform assembly having a surveillance platform that may be moved between an extended and a retracted position.

A further object of the present invention is to provide a mobile observation platform assembly that will securely support at least one person when in an extended position.

An additional object of the present invention is to provide an observation platform assembly that is freestanding when in the extended position.

A further object of the present invention is to provide an observation platform assembly that occupies a small volume area when in a retracted position.

The mobile observation platform assembly according to the present invention includes a series of articulated members that allow a user to move a surveillance platform between an extended position and a retracted position. More specifically, the mobile observation platform assembly includes a base platform with an articulated posterior frame and an articulated anterior frame pivotally connected to the base platform. The posterior frame is connected to the anterior frame when the mobile observation platform assembly is in the extended position. Moreover, the surveillance platform is pivotally connected to the anterior frame so that the surveillance platform may be rotated to connect with the posterior frame when the observation stand is in the extended position.

The posterior frame includes a principal rear frame member and a basal rear frame member. The principal rear frame member includes two inverted L-shaped arms that are joined together by a series of horizontal support beams. The basal rear frame member includes a pair of straight vertical rods, with the straight rods being joined together by a series of substantially horizontal support beams. Additionally, the principal rear frame member and basal rear frame member both include a ladder segment having a series of rungs that allow the user of the observation stand to climb to the surveillance platform. Moreover, the surveillance platform includes a recessed cavity positioned proximate the ladder segment of principal rear frame member that allows the user easy access to the uppermost surface of the surveillance platform from this ladder segment.

The anterior frame includes a principal frontal frame member and a basal frontal frame member. Similar to the principal rear frame member, the principal frontal frame member includes two inverted L-shaped arms, with the L-shaped arms conventionally being joined together by at least one support beam. The basal frontal frame member includes a pair of straight vertical rods, with the straight rods also being joined together by at least one support beam and by a series of support cross braces, as discussed further herein. It should be noted that each straight rod is preferably hollow, with each straight rod being able to receive a leveling leg or foot at the lower end. Each leveling leg is slidable within the straight rod, and is locked into a position within the straight rod using a conventional pin that connects the straight rods with the respective leveling leg. Consequently, the user may adjust the position of the leveling leg within each straight rod to provide the desired support on the specific terrain associated with the location of the mobile observation stand.

As discussed above, both the posterior frame and the anterior frame include upper frame members and lower frame members, respectively. Each upper frame member is connected to the respective lower frame member via a pair of rollover lock joints. One rollover lock joint is connected between each inverted L-shaped arm and respective corresponding straight rod. More specifically, each rollover lock joint includes a pair of joint plates that are connected to opposing sides of each straight rod, with a pivot rod further connecting the joint plates. The rollover lock joint additionally includes a cylindrical sleeve, and the cylindrical sleeve is attached to each inverted L-shaped arm. The cylindrical sleeve is attached a short distance from the straight rod end to allow the rod to be pinned, and surrounds the pivot rod to allow each L-shaped arm to pivot about the pivot rod. Consequently, the L-shaped arm may pivot between a locked extended position and an unlocked retracted position. When in the extended position, a conventional lock pin may be inserted into the joint plates so as to prevent the movement of the respective L-shaped arm.

When the observation platform assembly is in the extended position, a series of cross braces may be attached between the lower frame members to reinforce the general stability of the observation platform assembly. More specifically, a pair of support cross braces are attached between the straight rod and the straight arm of the anterior lower frame member. In addition, two separate pairs of auxiliary cross braces connect the posterior lower frame member with the anterior lower frame straight rod, and the anterior lower frame member with the posterior lower frame straight rod. These cross braces therefore stabilize the observation platform assembly for the user to safely climb the ladder segment and stand or sit on the surveillance platform.

The observation platform assembly additionally includes a pair of leverage or lifting cams, with one lifting cam being attached to each L-shaped arm of the posterior frame member. The lifting cams provide a mechanical advantage to the present design to aid the user in repositioning the observation platform assembly between the extended position and the retracted position. Furthermore, it should be noted that in one embodiment, the L-shaped arms of the upper anterior and posterior assemblies overlap when in the extended position and are connected with conventional pins to aid in stabilizing the upper assembly.

These and other objects and advantages of the invention and the operation thereof will become apparent from the following detailed description of the preferred embodiment of the invention.

BRIEF DESCRIPTION OF THE DRAWINGS

A mobile observation platform assembly embodying the features of the present invention is depicted in the accompanying drawings which form a portion of this disclosure and wherein:

FIG. 15a is an enlarged perspective view of the rollover lock joint used in the present invention, the rollover lock joint being in the extended position; and FIG. 15b is an enlarged perspective view of the rollover lock joint used in the present invention, the rollover lock joint being in the retracted position.

DESCRIPTION OF THE PREFERRED EMBODIMENTS

Figure 1:
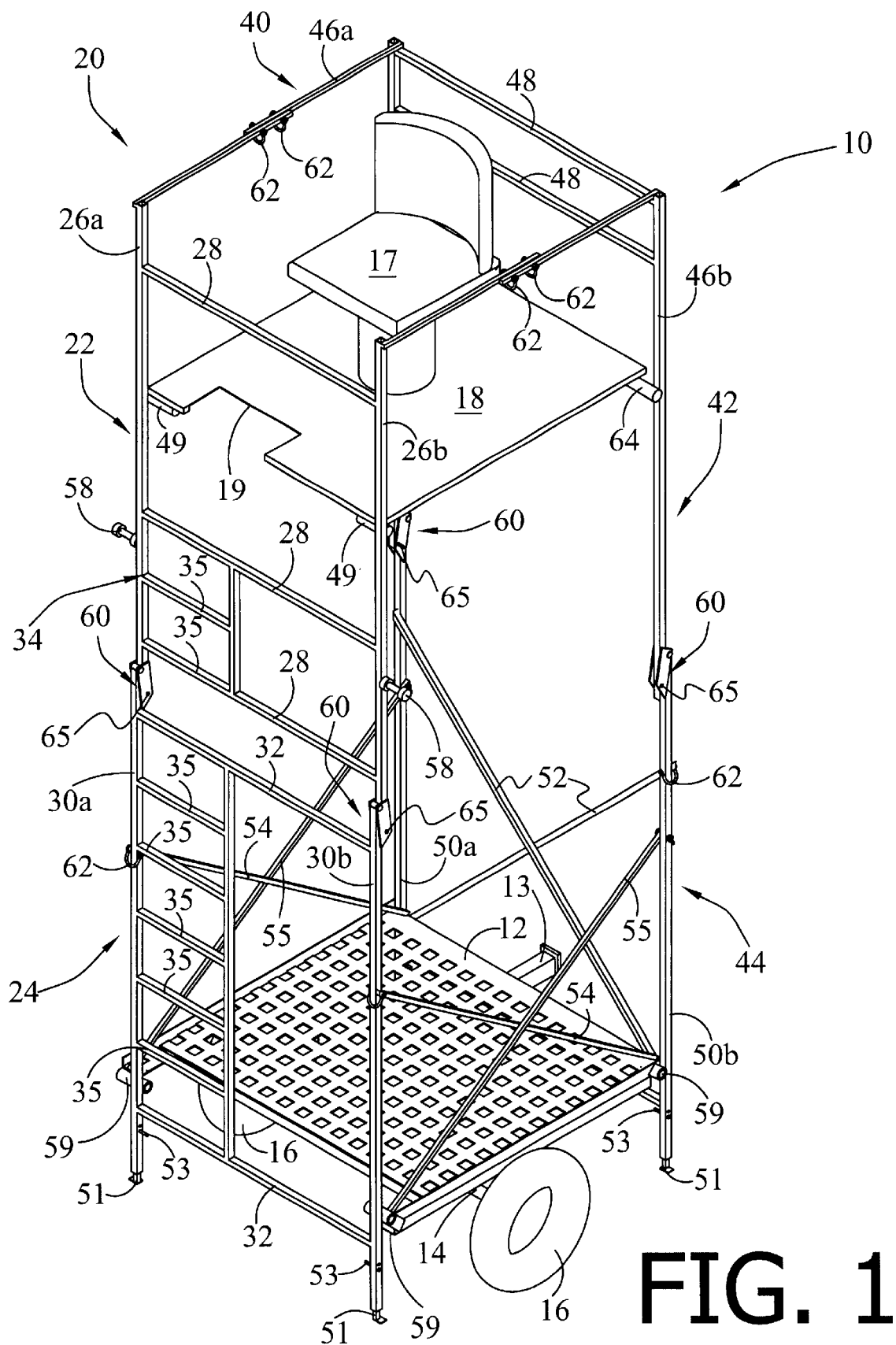
FIG. 1 is a rear perspective view of the mobile observation platform assembly of the present invention, the mobile observation platform assembly being in an extended position.
Figure 2A:
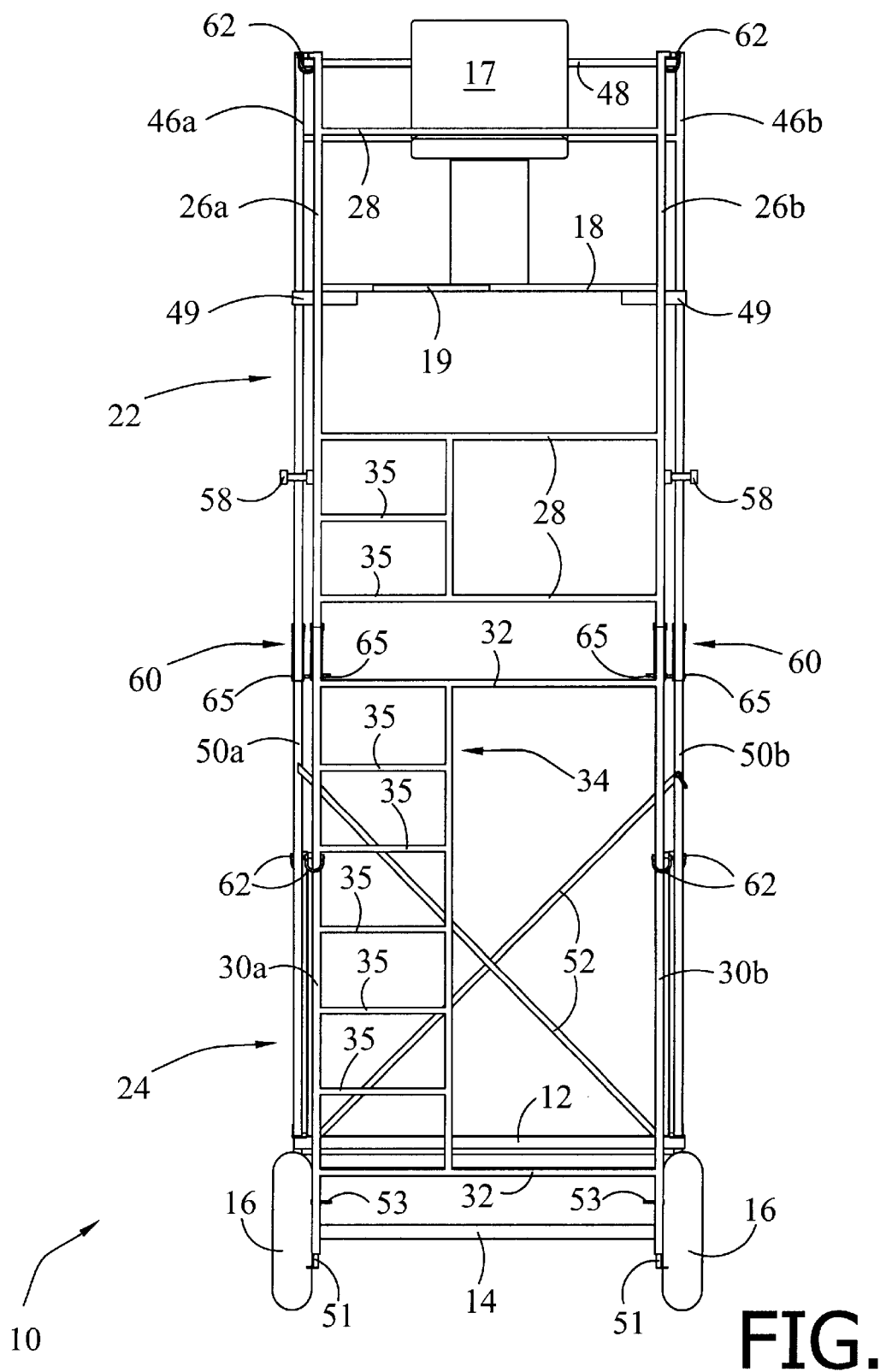
FIG. 2a is a rear elevational view of the mobile observation platform assembly as illustrated in FIG. 1.
Figure 2B:
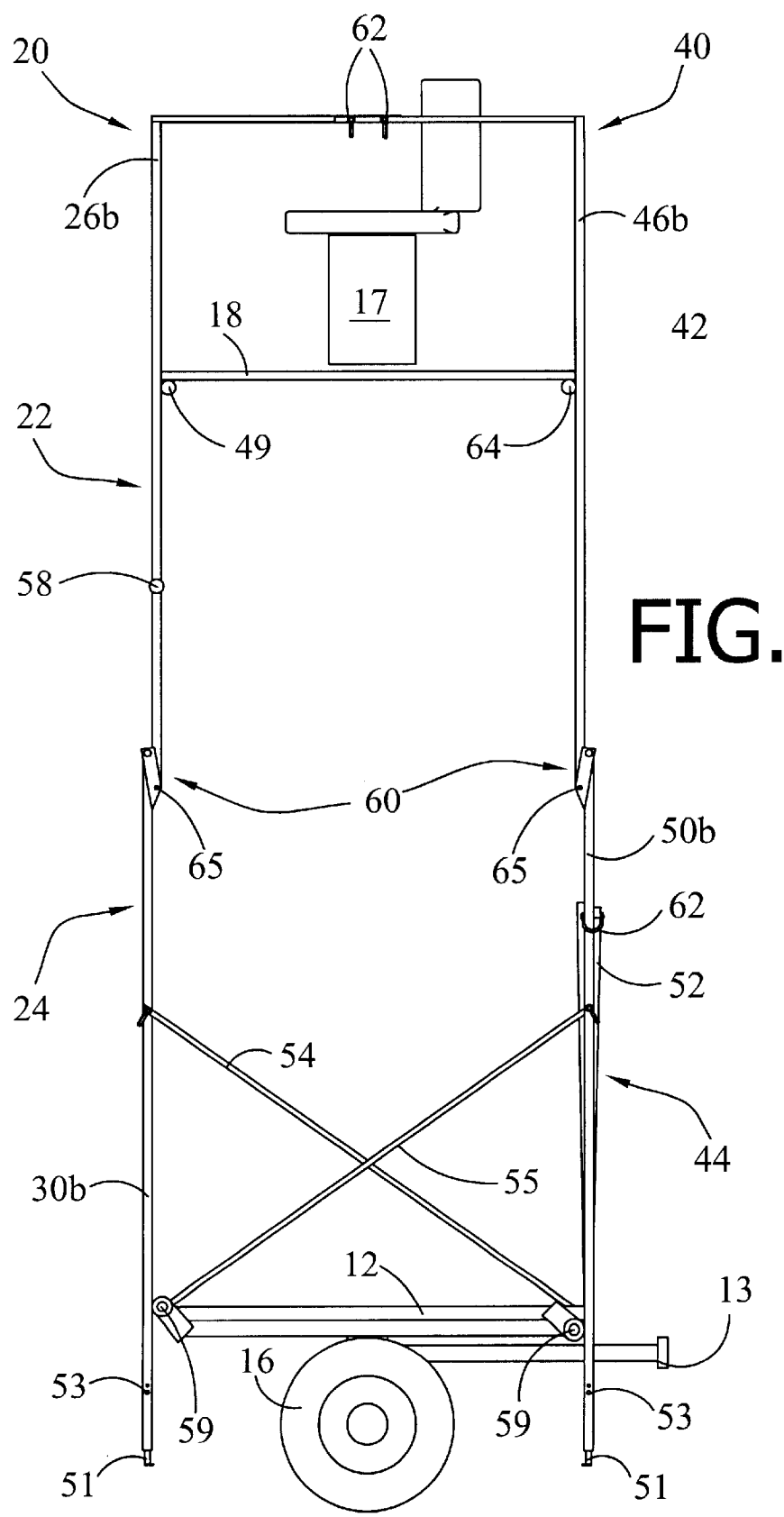
FIG. 2b is a side elevational view of the mobile observation platform assembly as illustrated in FIG. 1.
Figure 3:
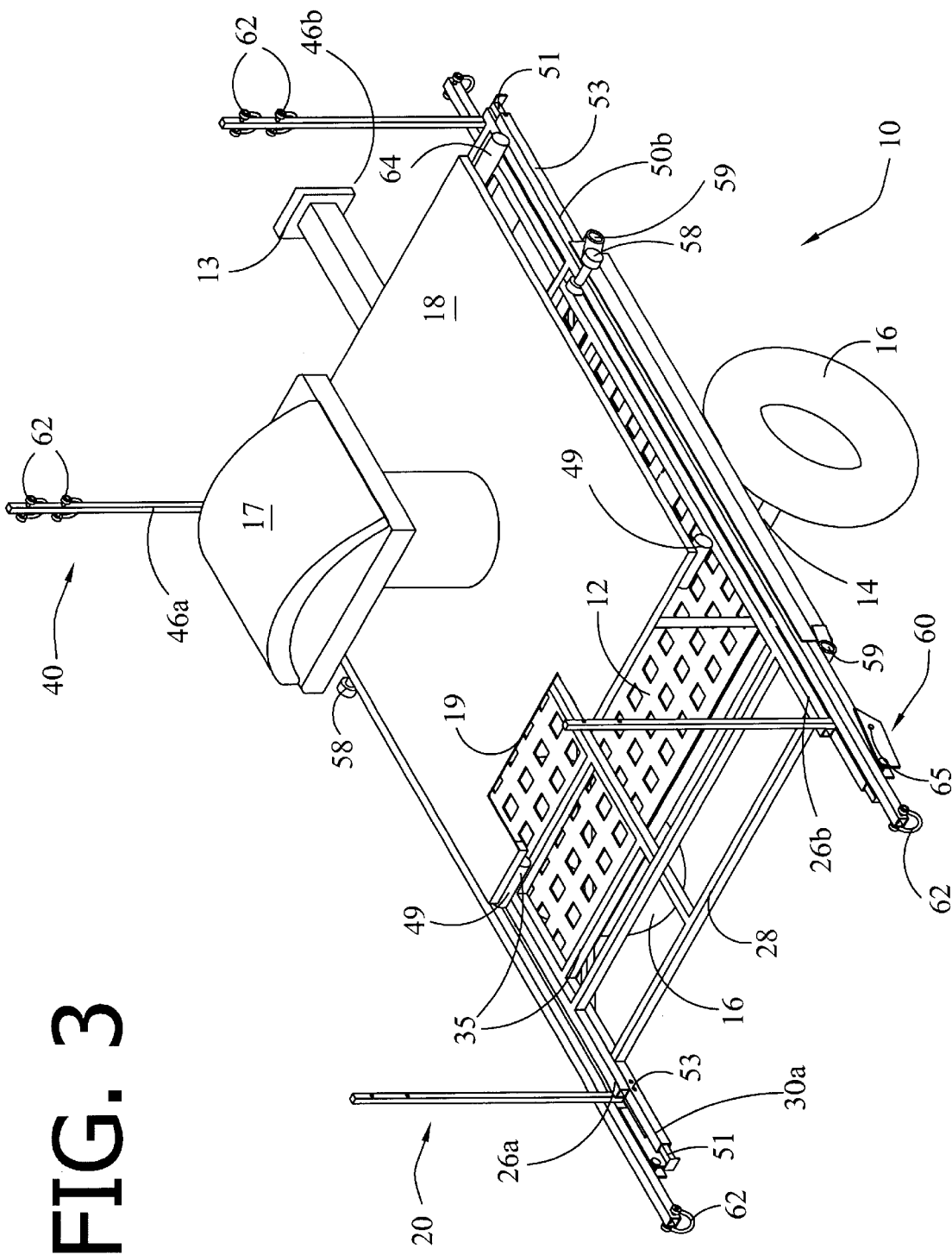
FIG. 3 is a rear perspective view of the mobile observation platform assembly of the present invention, the mobile observation platform assembly being in a retracted position.
Figure 4:
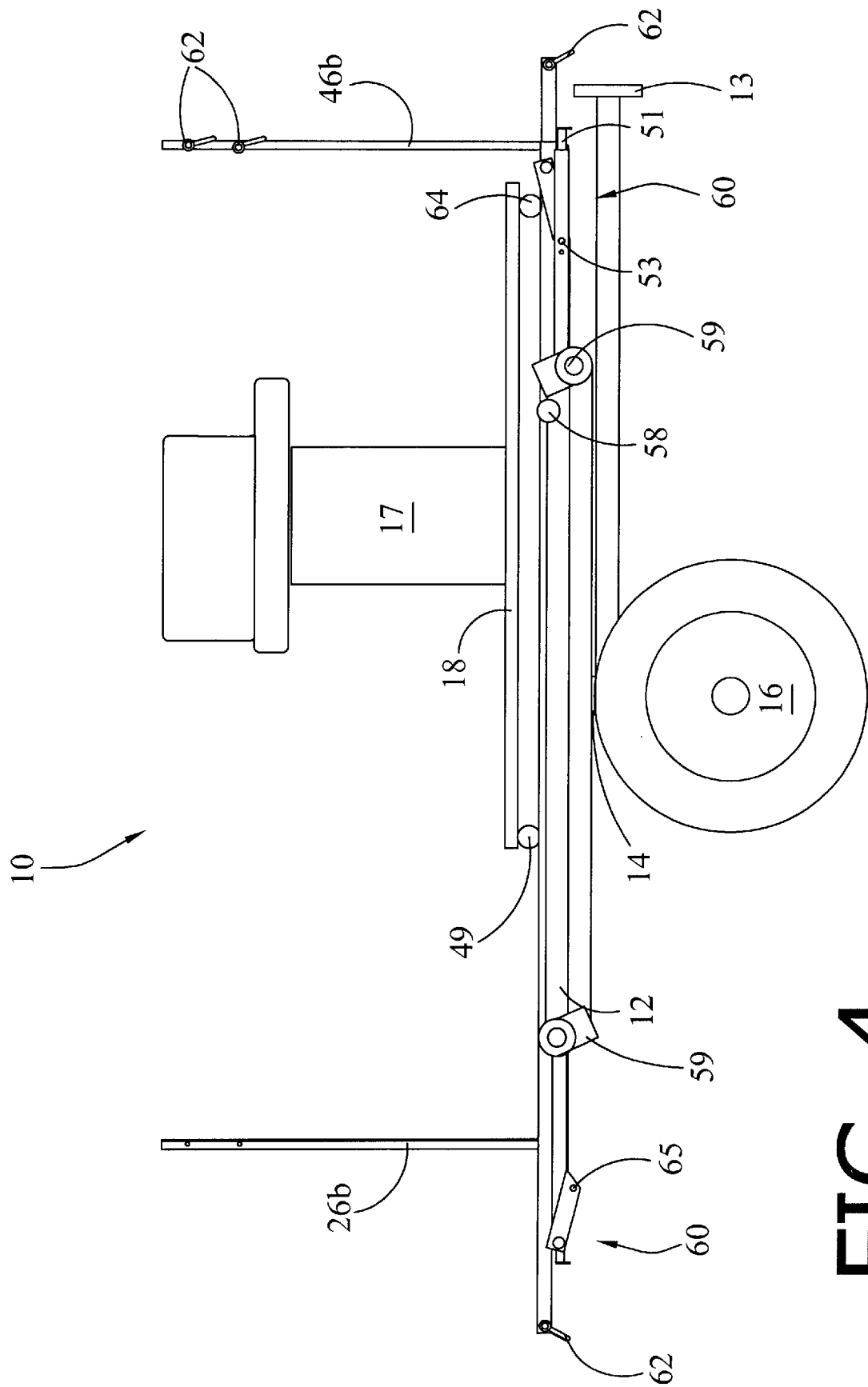
FIG. 4 is a side elevational view of the mobile observation platform assembly as illustrated in FIG. 3.

Referring to the figures for a better understanding of the articulated mobile observation platform assembly 10 of the present invention, it will be appreciated that the preferred embodiment of the present invention comprises a series of articulated members that allow a user to move a surveillance platform 18 between an extended position (see FIGS. 1, 2a and 2b) and a retracted position (see FIGS. 3 and 4). More specifically, the mobile observation platform assembly 10 includes a trailer bed or base platform 12 having a posterior side and an anterior side, with a conventional trailer hitch 13 attached to said anterior side. Moreover, an axle 14 is rotatably connected to the base platform 12 in a conventional manner, with a pair of wheels 16 attached to the two ends of the axle 14 to provide transportability of the mobile observation platform assembly 10. The mobile observation platform assembly 10 additionally includes an articulated posterior frame 20 having one end pivotally connected to the posterior side of the base platform 12, and an articulated anterior frame 40 having one end pivotally connected to the anterior side of the base platform 12. The unattached end of the posterior frame 20 is joined with the unattached end of the anterior frame 40 when the mobile observation platform assembly 10 is in the extended position, as shown in FIG. 1 and discussed further herein. Moreover, the surveillance platform 18 is pivotally connected to the anterior frame 40 so that the surveillance platform 18 may be pivoted to connect with the posterior frame 20 when the observation platform assembly 10 is in the extended position, thereby providing a secure supportive surface for the user of the observation platform assembly 10.

Looking specifically to FIGS. 1, 2a, and 2b, the posterior frame 20 includes a principal rear frame member 22 and a basal rear frame member 24. The principal rear frame member 22 further includes two inverted L-shaped arms 26a, 26b that are joined together by several horizontal support beams or connecting braces 28. The basal rear frame member 24 includes a pair of straight rods 30a, 30b, with the straight rods 30a, 30b being joined together by a series of substantially horizontal support beams or connecting braces 32. Additionally, the principal rear frame member 22 and basal rear frame member 24 both include a ladder segment 34 having a series of rungs 35 that allow the user of the observation platform assembly 10 to climb to the surveillance platform 18. Moreover, the surveillance platform 18 includes a recessed cavity 19 positioned proximate the ladder segment 34 of principal rear frame member 22 that allows the user easy access to the uppermost surface of the surveillance platform 18 from this ladder segment 34. The recessed cavity 19 may be positioned within the platform 18 as desired by the manufacturer to provide the desired access to the platform 18 by the user.

Continuing to view FIGS. 1, 2a, and 2b, the anterior frame 40 includes a principal frontal frame member 42 and a basal frontal frame member 44. Similar to the principal rear frame member 22, the principal frontal frame member 42 includes two inverted L-shaped arms 46a, 46b, with the L-shaped arms 46a, 46b conventionally being joined together by at least one support beam 48. The basal frontal frame member 44 includes a pair of straight rods 50a, 50b, with the straight arms 50a, 50b also being joined by a series of support cross braces 52, as discussed further herein. In the extended position, the L-shaped arms 46a, 46b of the principal frontal frame member 42 are connected with the L-shaped arms 26a, 26b of the principal rear frame member 22 via a series of pins 62. This connection further reinforces the assembly of the invention.

It should be noted that each straight rod 30a, 30b, 50a, and 50b is preferably hollow, with each straight rod 30a, 30b, 50a, and 50b being able to receive a leveling leg or foot 51. Each leveling leg 51 is slidable within the straight rod 30a, 30b, 50a, and 50b, and is locked into a position within the straight rod 30a, 30b, 50a, and 50b using a conventional pin 53 that connects the straight rods 30a, 30b, 50a, and 50b with the respective leveling leg 51 through a series of sequential holes. Consequently, the user may adjust the position of the leveling leg 51 within each straight rod 30a, 30b, 50a, and 50b to provide the desired support on the specific terrain associated with the location of the mobile observation platform assembly 10.

As discussed above, both the posterior frame 20 and the anterior frame 40 include upper frame members 22, 42 and lower frame members 24, 44, respectively. Each upper frame member 22, 42 is connected to the respective lower frame member 24, 44 via a pair of rollover lock joints 60, as illustrated in detail in the enlarged views of FIGS. 15a and 15b. In the preferred embodiment, one rollover lock joint 60 is connected between each inverted L-shaped arm 26a, 26b, 46a, and 46b and respective corresponding straight rod 30a, 30b 50a, and 50b. More specifically, each rollover lock joint 60 includes a pair of joint plates 61a, 61b that are connected to opposing sides of each straight rod 30a, 30b 50a, and 50b. In addition, a pivot rod 64 further connects the joint plates 61a, 61b. The rollover lock joint 60 also includes a cylindrical sleeve 66, and the cylindrical sleeve 66 is attached to the lower end of each inverted L-shaped arm 26a, 26b, 46a, and 46b. The cylindrical sleeve 66 surrounds the pivot rod 64 to allow each L-shaped arm 26a, 26b, 46a, and 46b to pivot about the pivot rod 64. Consequently, the L-shaped arm 26a, 26b, 46a, and 46b may pivot between a locked extended position (see FIG. 15a) and an unlocked retracted position (see FIG. 15b). When in the locked position, the lock pin 62 may be inserted through the joint plates 61a, 61b so as to prevent the movement of the respective L-shaped arm 26a, 26b, 46a, and 46b.

When the observation platform assembly 10 is in the extended position, a series of cross braces may be attached between the lower frame members 24, 44 to reinforce the general stability to the observation platform assembly 10. More specifically, a pair of support cross braces 52 are attached between straight rod 50a and straight rod 50b of the anterior lower frame member 44. In addition, two separate pairs of cross braces (auxiliary posterior cross braces 54 and auxiliary anterior cross braces 55) connect the posterior lower frame member 24 with the anterior lower frame member 44. These support and auxiliary cross braces 52, 54, and 55 therefore strengthen and stabilize the observation platform assembly 10 for the user to safely climb the ladder segment 34 and walk or sit on the surveillance platform 18.

The observation platform assembly 10 additionally includes a pair of leverage or lifting cams 58, with one lifting cam 58 being attached to each L-shaped arm 26a, 26b of the posterior frame member 22. The lifting cams 58, as incorporated into the present design, provide a mechanical advantage to aid the user in repositioning the observation platform assembly 10 between the extended position and the retracted position. The use of the lifting cams 58 will be discussed further herein.

Looking now to FIGS. 1–13b, we will describe the process of repositioning the observation platform assembly 10. For clarity purposes, the process that will be discussed in detail will illustrate the repositioning of the observation platform assembly 10 from the extended position (see FIGS. 1, 2a, and 2b) to the retracted position (see FIGS. 3 and 4). It is important to note at the outset that this repositioning process may simply be substantially reversed to reposition the observation platform assembly 10 from the retracted position to the extended position. Looking specifically to FIGS. 2a and 2b, the observation platform assembly 10 is shown in the extended position for a user to be elevated on the surveillance platform 18. As illustrated, one end of each auxiliary cross brace 54, 55 is permanently interconnected to a respective rotating joint 59 attached to the trailer base 12, while the opposing end of each auxiliary cross brace 54, 55 is detachably connected to one of the straight rods 30a, 30b, 50a, 50b of the lower frame members 24, 44. To begin the repositioning process, the user verifies that the trailer hitch 13 is secured to a stable item, such as a vehicle (not illustrated). Once the trailer bed 12 is secure, the pins 62 that join L-shaped arms 26a, 26b with L-shaped arms 46a, 46b are removed, and the leveling legs 51 are retracted into the straight rods 30a, 30b, 50a, 50b. Next, the anterior cross braces 52 are disconnected from straight rods 50a, 50b and folded down across and onto the trailer base 12. The auxiliary posterior cross braces 54 are then disconnected from the respective posterior straight rods 30a, 30b of the basal rear frame member 24 such that the posterior frame 20 may be pivotally moved toward the anterior frame 40. The user stands on base 12 and removes lock pins 65 from posterior rollover lock joints 60. The user grasps the lower horizontal support beam 28 and pulls it toward the anterior frame 40, controlling the descent of the platform 18 and posterior frame 20.

Figure 5:
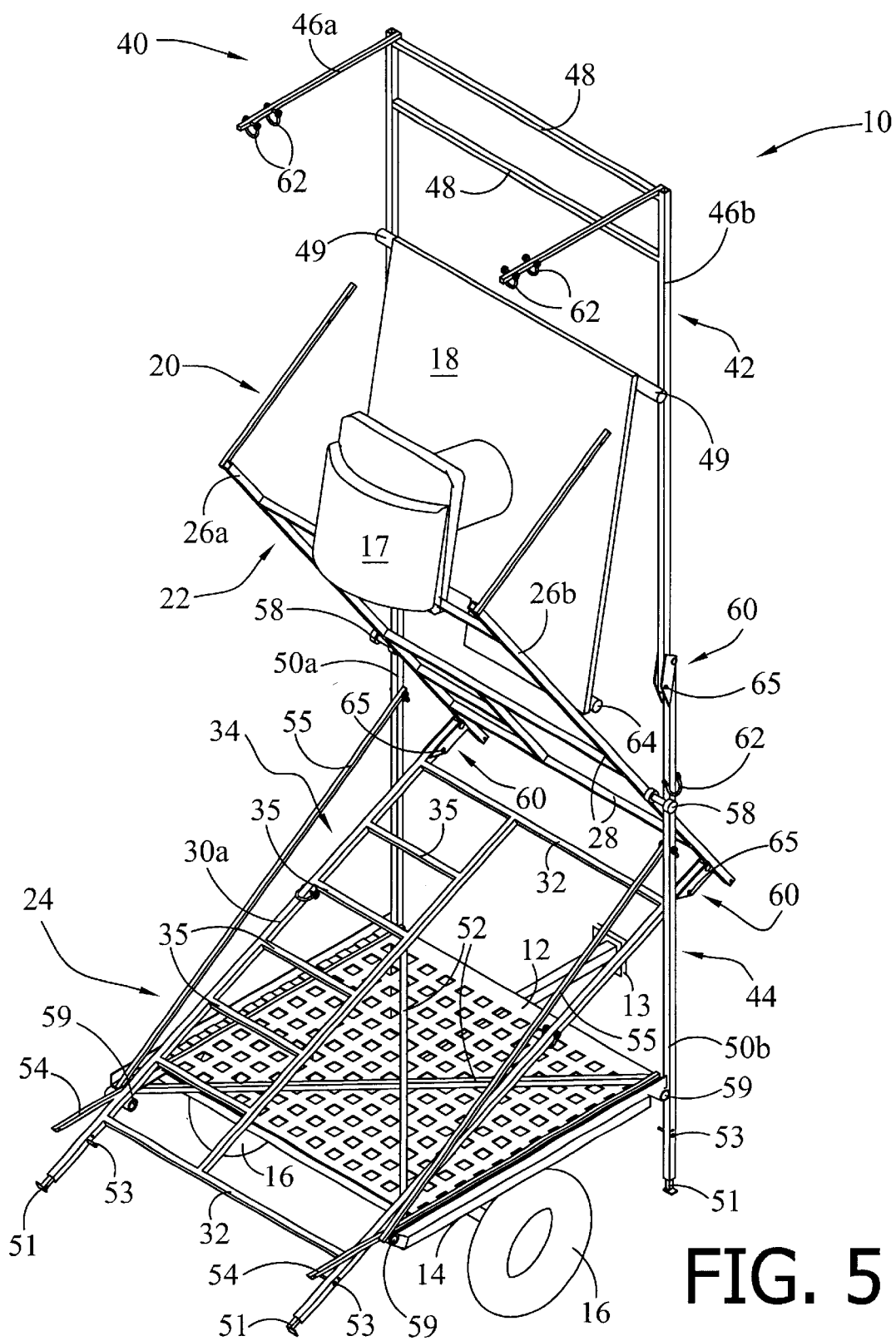
FIG. 5 is a rear perspective view of the mobile observation platform assembly of the present invention, with the mobile observation platform assembly being retracted from the position illustrated in FIG. 1.
Figure 6:
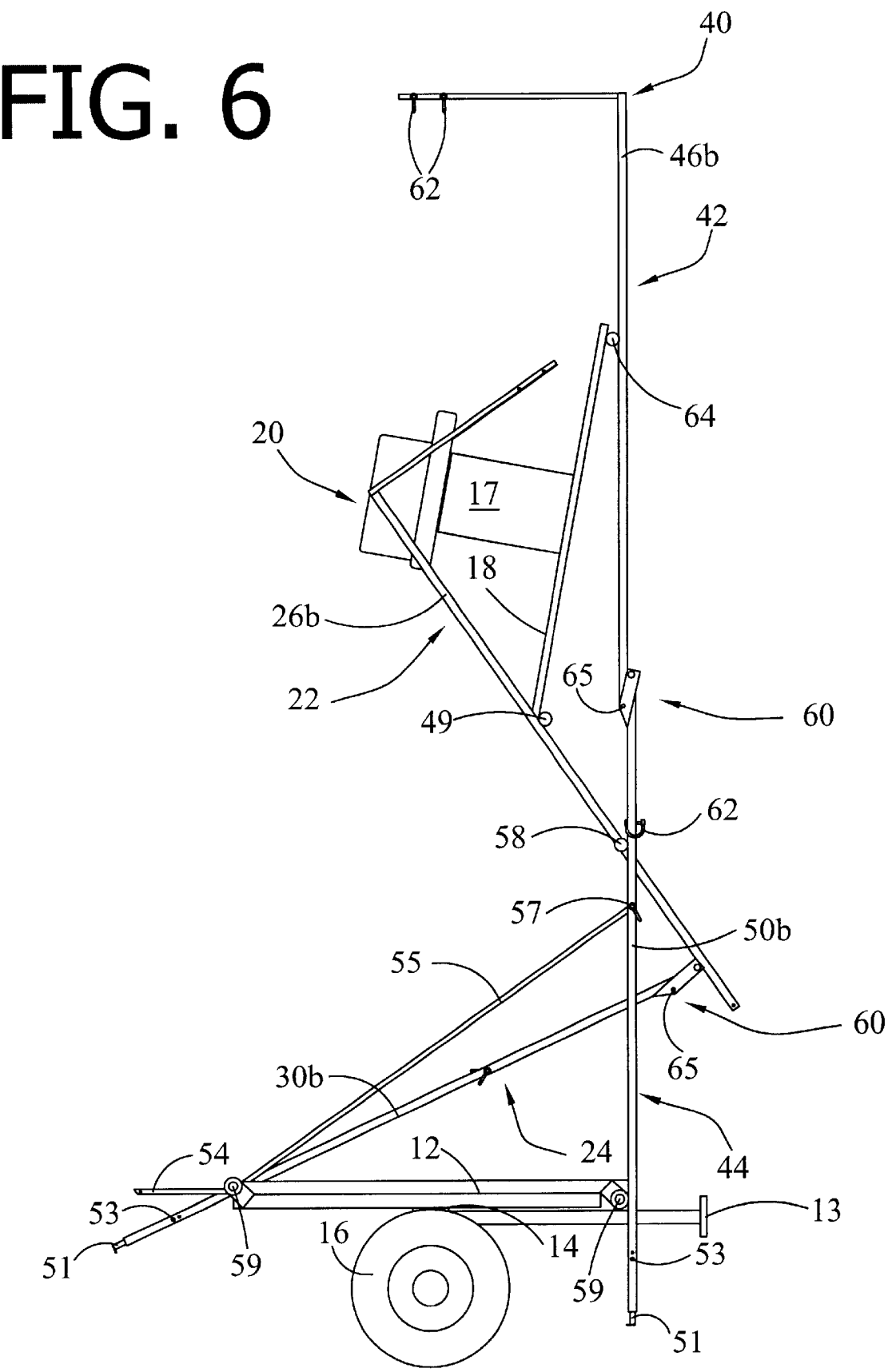
FIG. 6 is a side elevational view of the mobile observation platform assembly as illustrated in FIG. 5.
Figure 7:
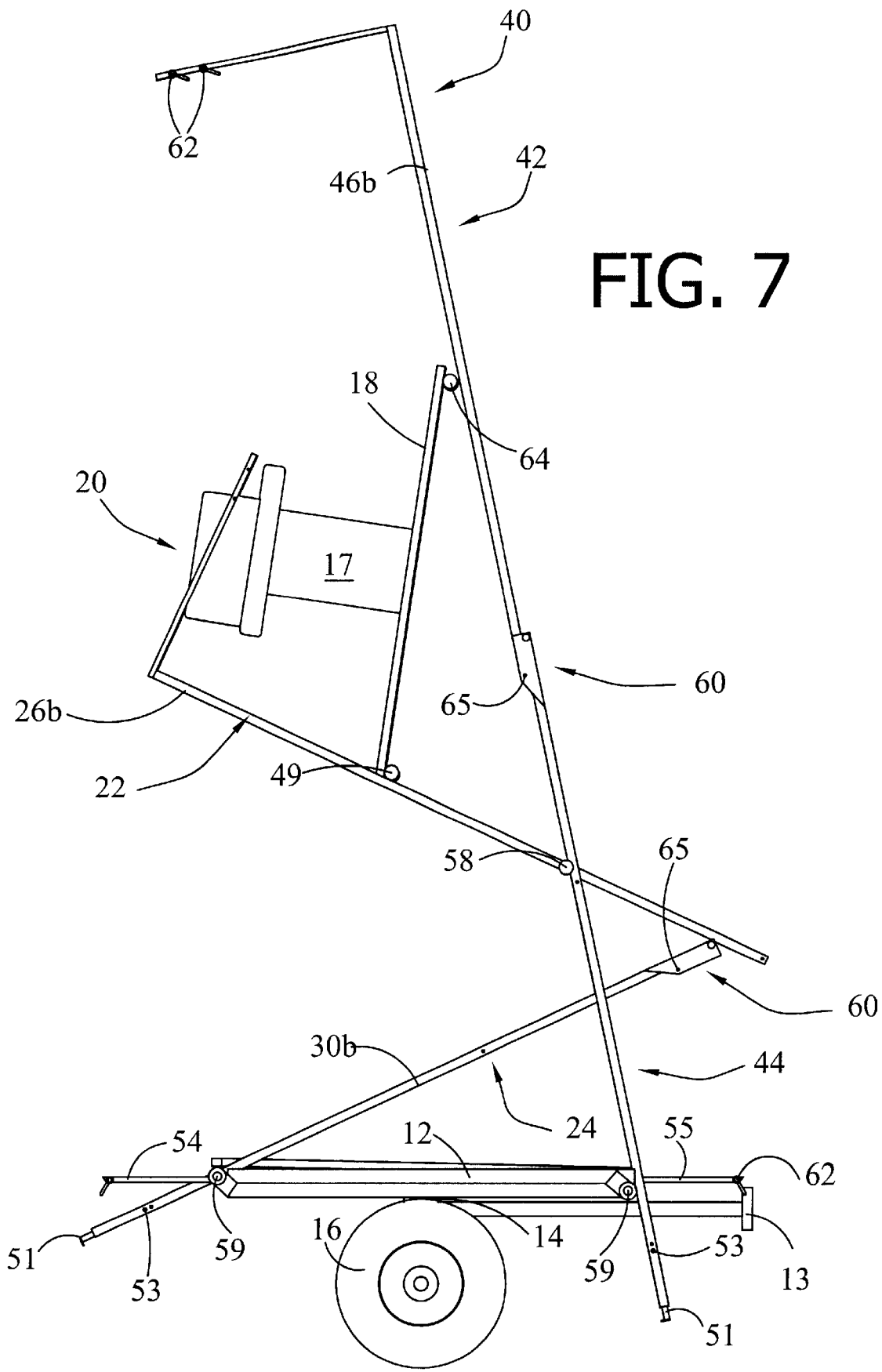
FIG. 7 is a side elevational view of the mobile observation platform assembly of the present invention, with the mobile observation platform assembly being retracted from the position illustrated in FIG. 6.
Figure 8:
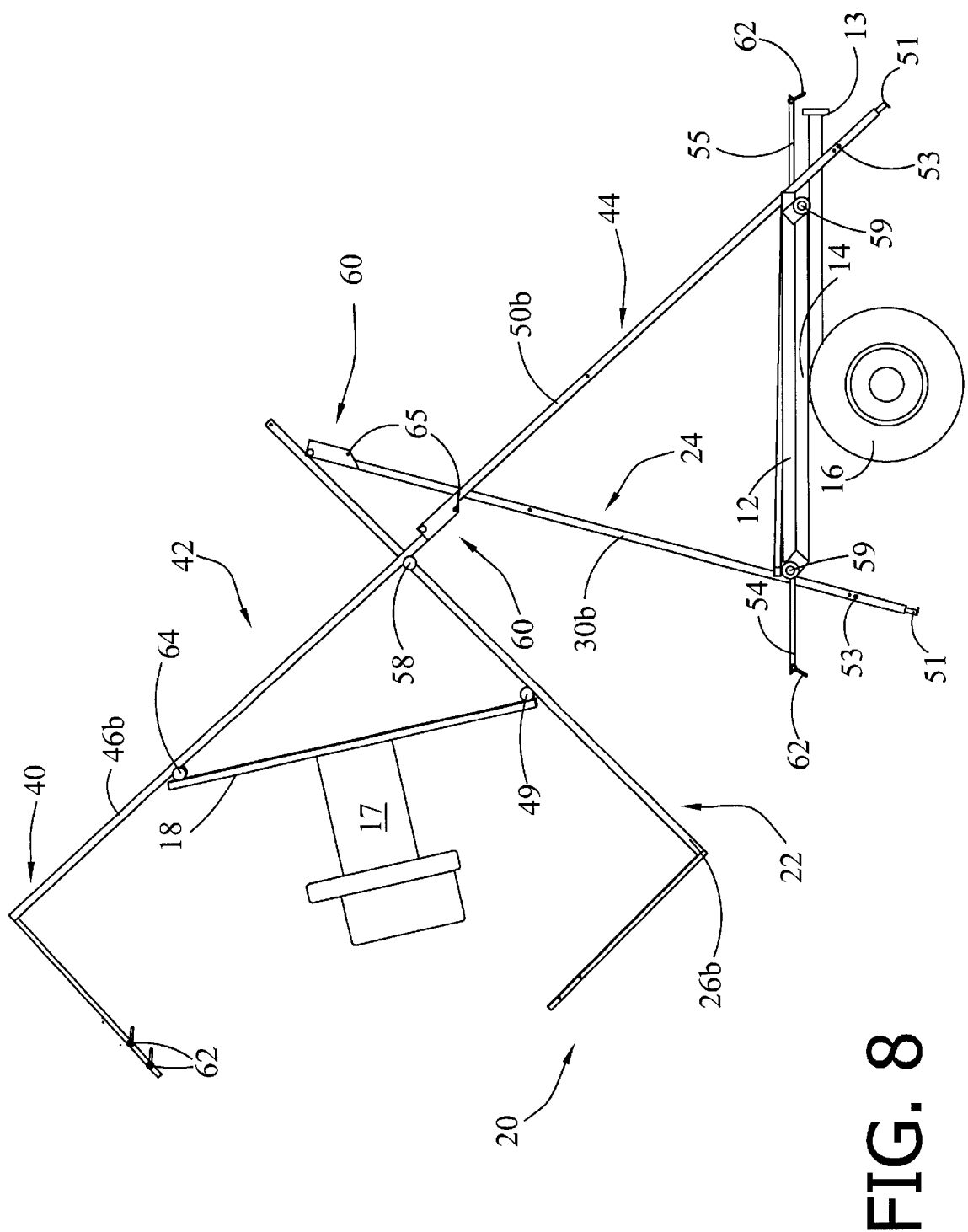
FIG. 8 is a side elevational view of the mobile observation platform assembly of the present invention, with the mobile observation platform assembly being retracted from the position illustrated in FIG. 7.
Figure 9:
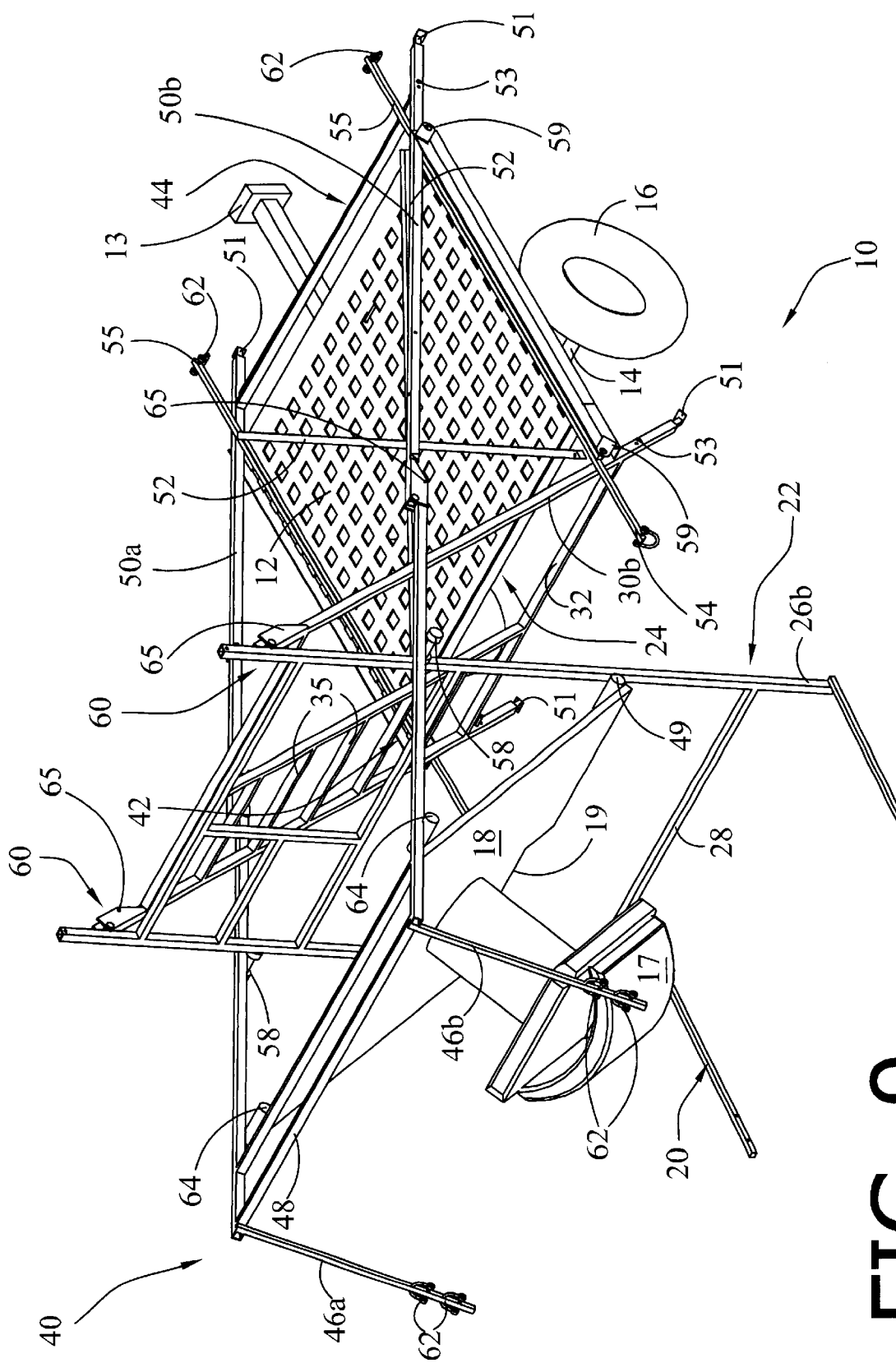
FIG. 9 is a rear perspective view of the mobile observation platform assembly of the present invention, with the mobile observation platform assembly being further retracted from the position illustrated in FIG. 7.
Figure 10:
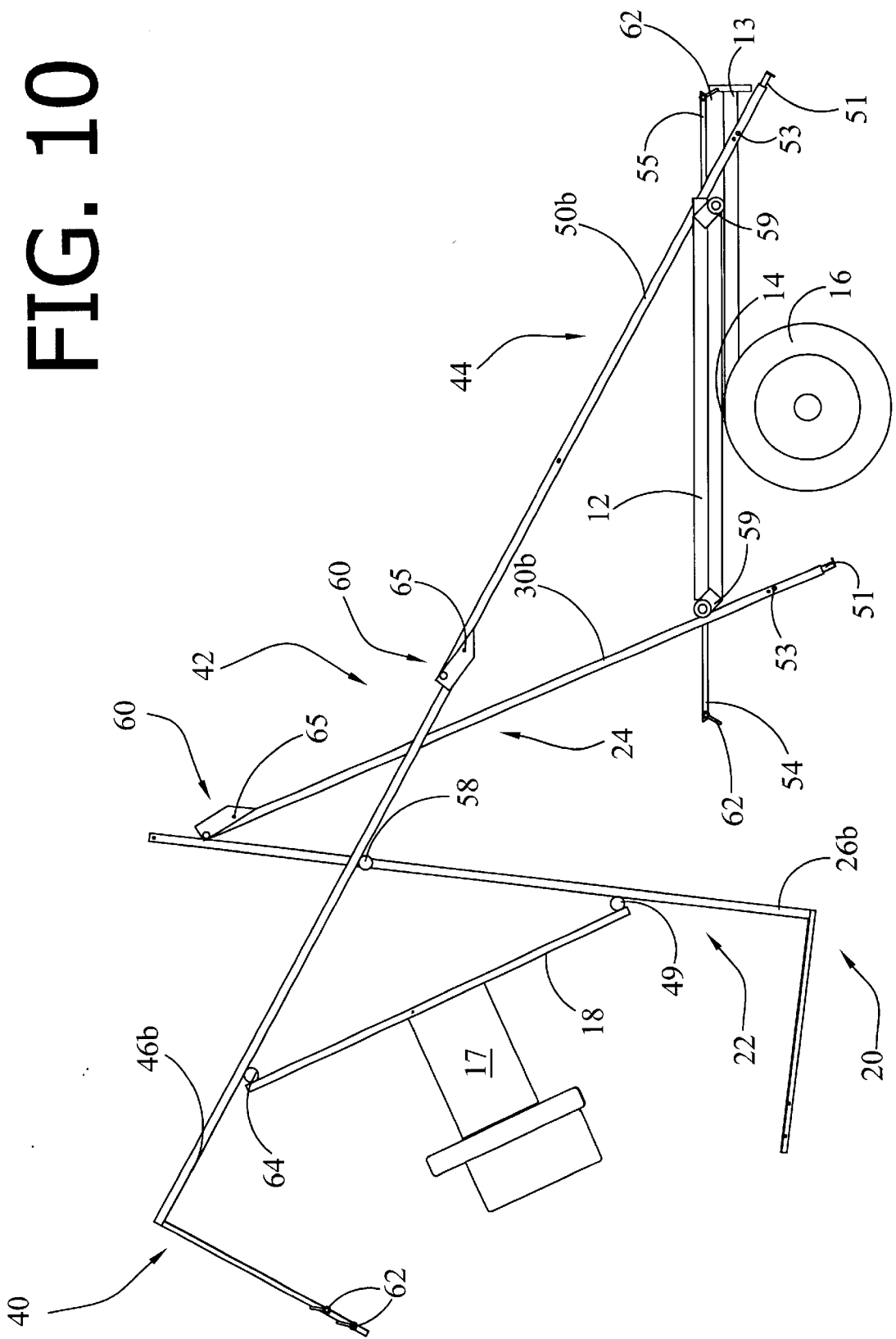
FIG. 10 is a side elevational view of the mobile observation platform assembly as illustrated in FIG. 9.
Figure 11:
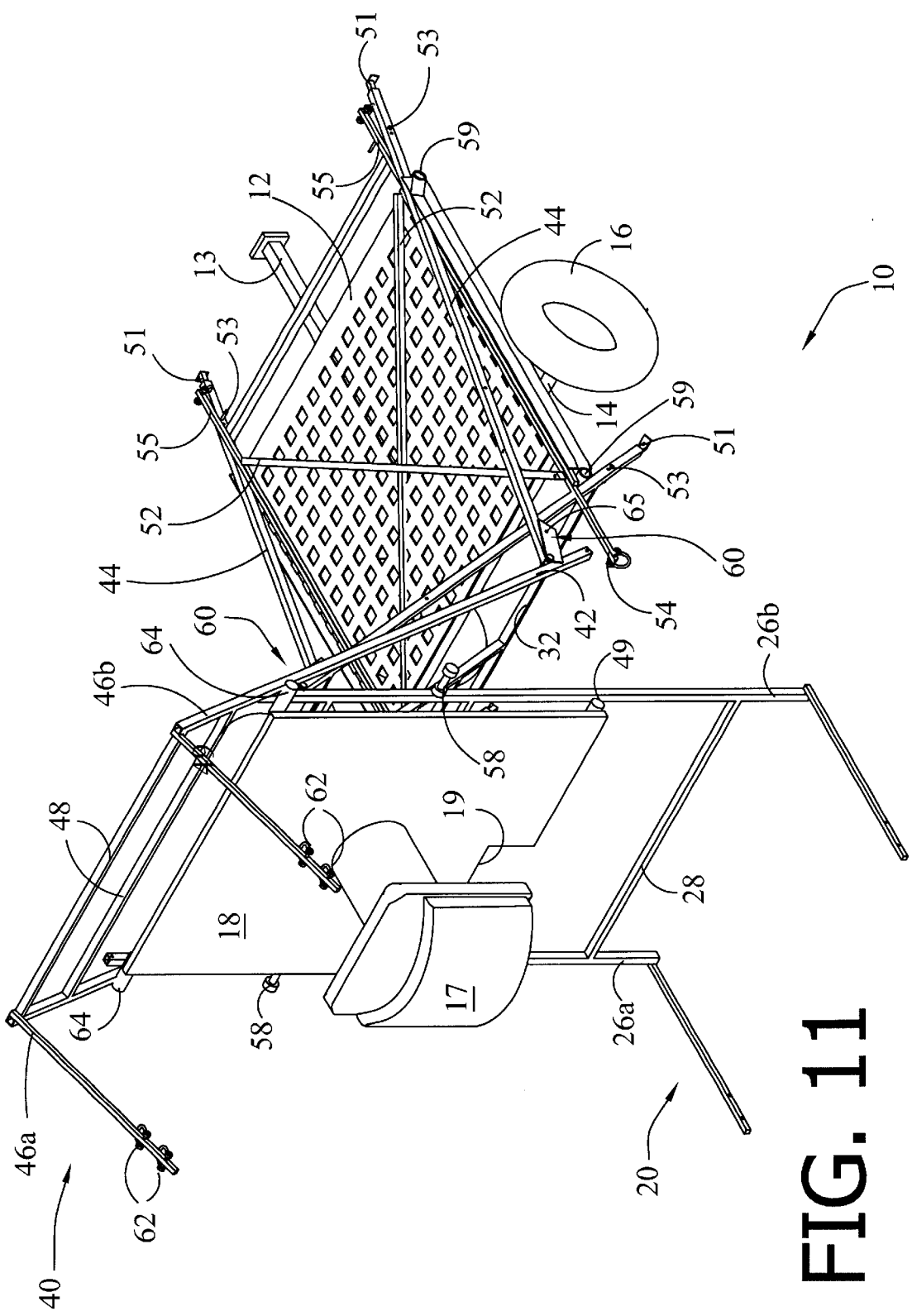
FIG. 11 is a rear perspective view of the mobile observation platform assembly of the present invention, the mobile observation platform assembly being further retracted from the position illustrated in FIG. 9.
Figure 12:
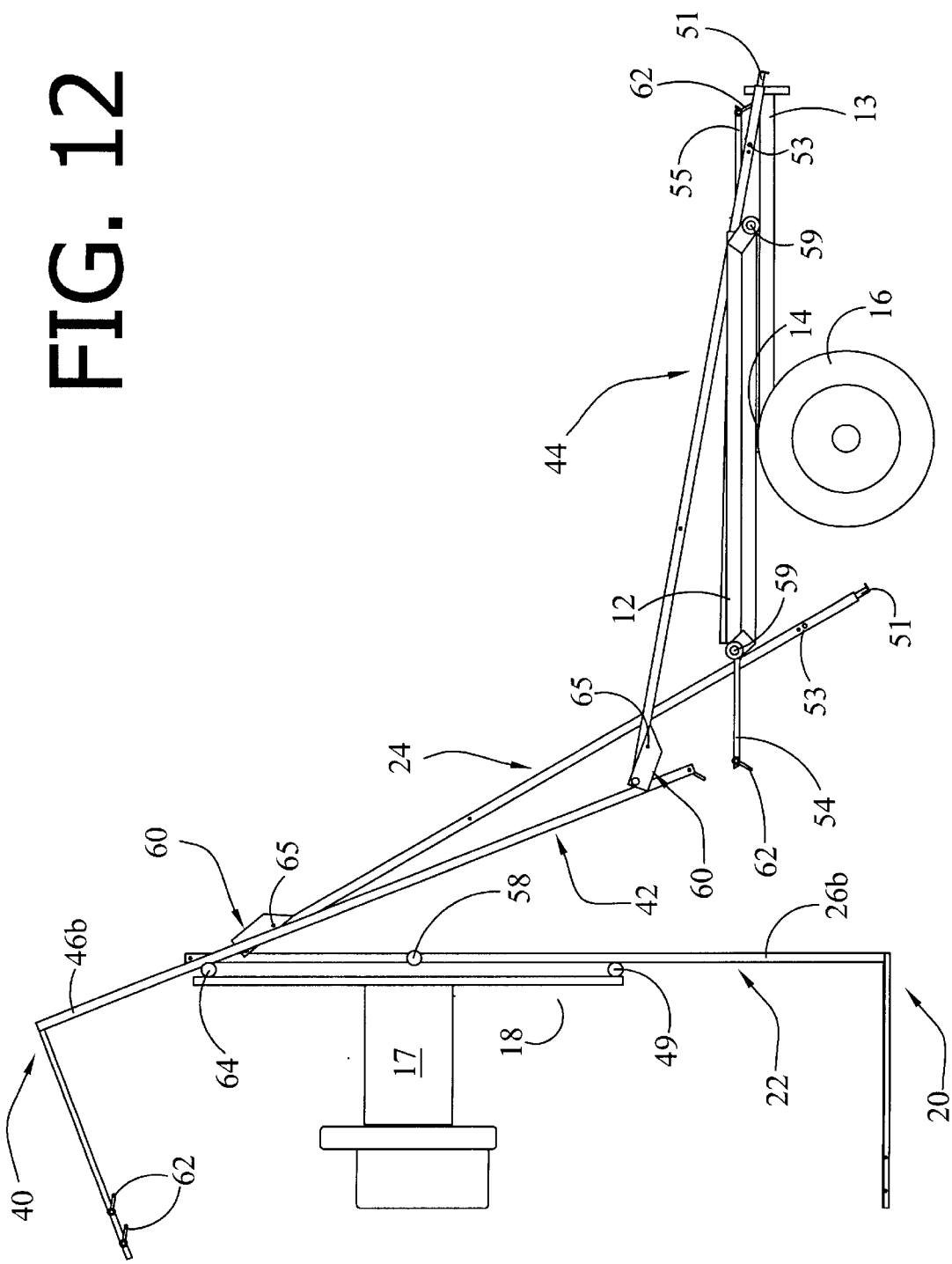
FIG. 12 is a side elevational view of the mobile observation platform assembly as illustrated in FIG. 11.
Figure 13:
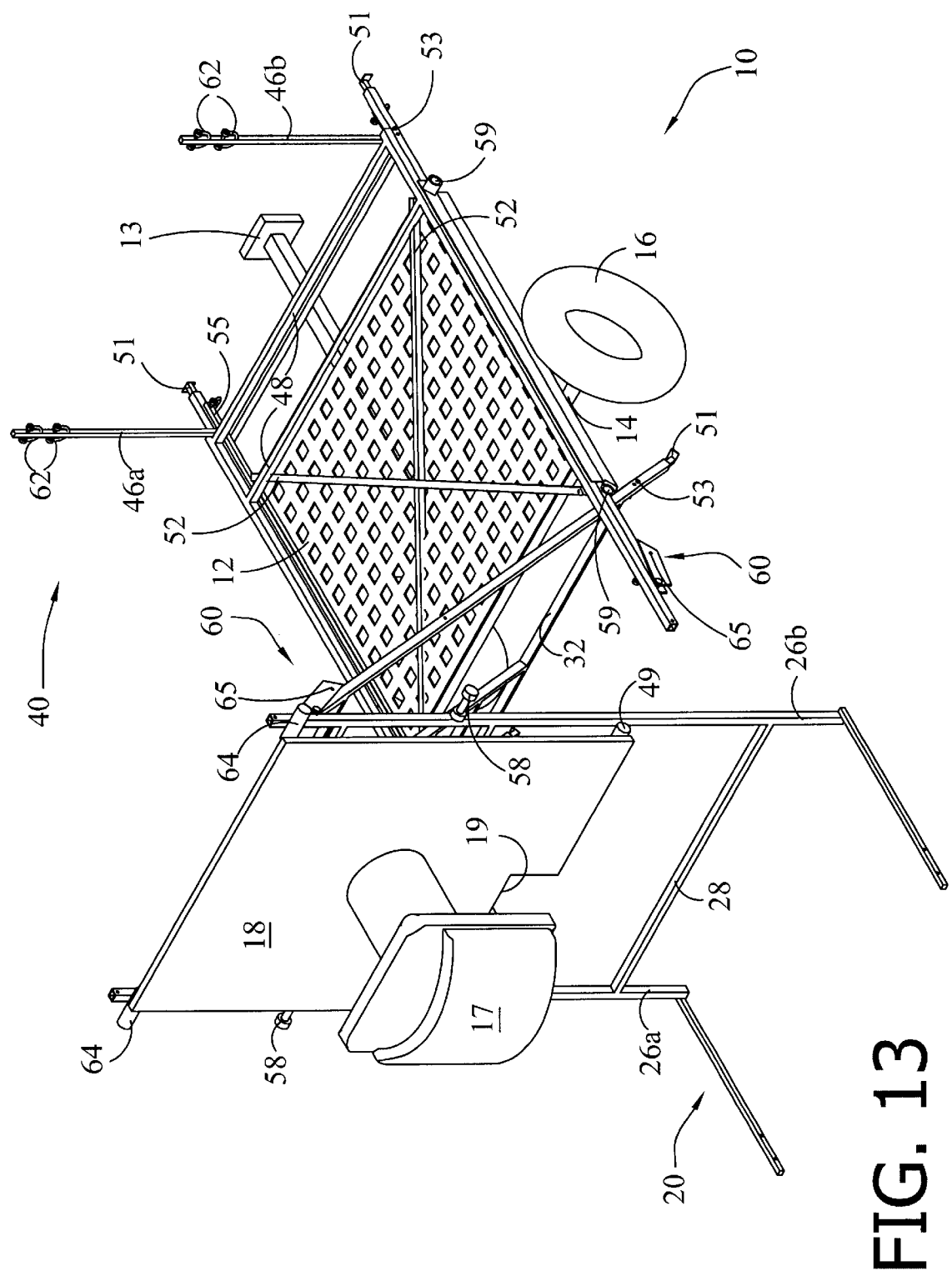
FIG. 13 is a rear perspective view of the mobile observation platform assembly of the present invention, with the mobile observation platform assembly being further retracted from the position illustrated in FIG. 11.
Figure 14:
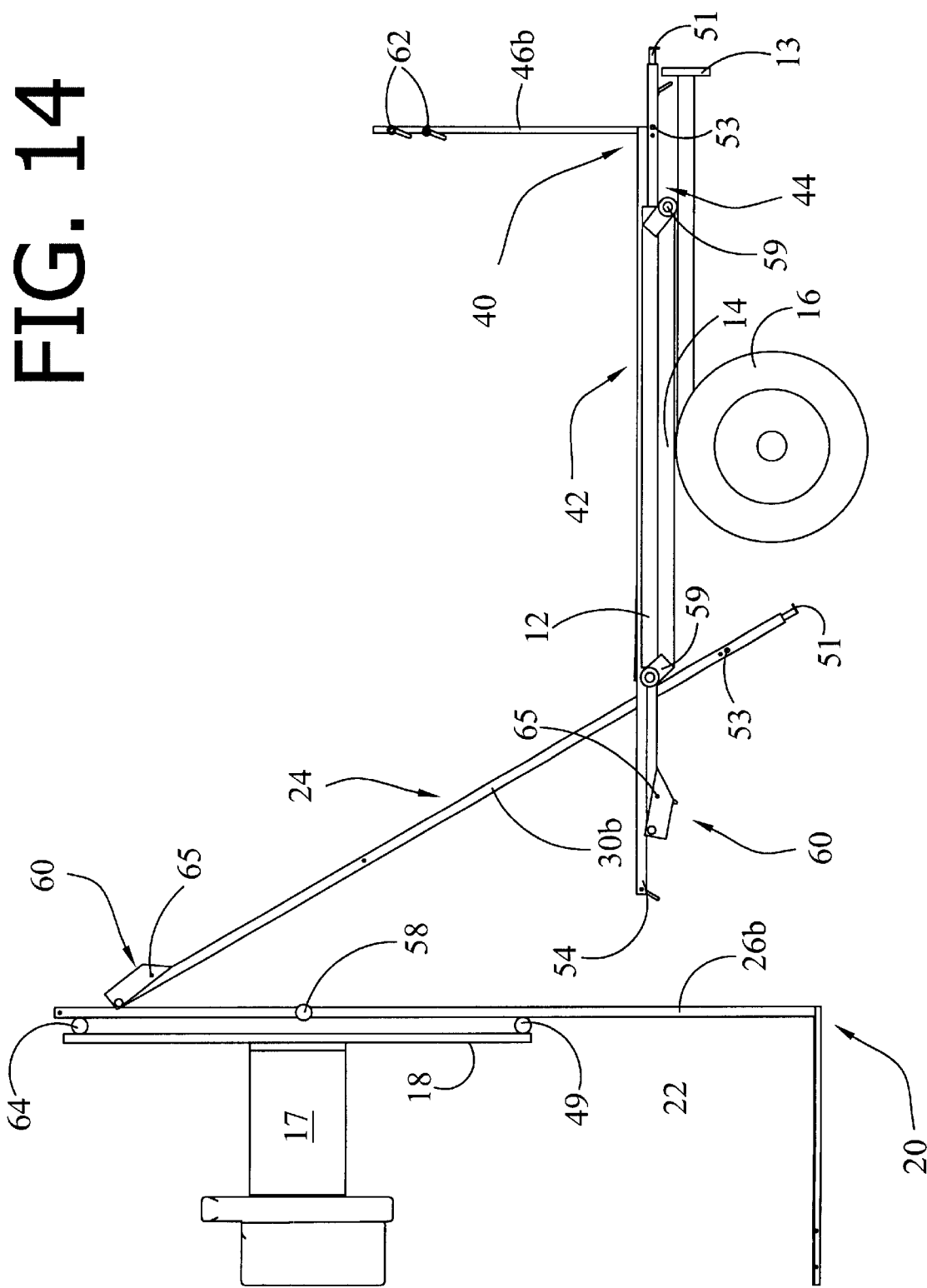
FIG. 14 is a side elevational view of the mobile observation platform assembly as illustrated in FIG. 13.

As the posterior frame 20 moves toward the anterior frame 40, the L-shaped arms 26a, 26b of the principal rear frame members 22 will pivot about the posterior rollover lock joint 60 (see FIGS. 5 and 6). As a result of the movement about the rollover lock joint 60, the L-shaped ends 26a, 26b of the principal rear frame member 22 will move toward the base or ground surface while the lower extremity of the straight rods 30a, 30b of the basal rear frame member 24 are elevated. The auxiliary anterior cross braces 55 preferably remain connected to the anterior frame 40. The posterior frame 20 continues to collapse and move through the anterior frame 40 until the lifting cams 58 on upper posterior frame 26a, 26b contact the lower anterior straight rods 50a, 50b (as illustrated in FIG. 6).

Next, quick release pins 57 are removed from the front support cross braces 55 that connect to straight rods 50a, 50b. The front support cross braces 55 are then folded down onto the trailer frame 12. Looking to FIGS. 1, 7, and 8, the user elevates the posterior frame 20 by manually lifting up on the cross brace 28 proximate the rollover lock joints 60, which further regulates the descent of both the posterior frame 20 as well as the anterior frame 40 with respect to the lifting cams 58. The posterior side 20 will continue to rise as the anterior frame 40 pivots downward, with the lifting cams 58 of the posterior frame 20 engaging the anterior frame 40 during the decent of the anterior frame 40. Finally, as the L-shaped arms 26a, 26b of the posterior frame 20 engage the ground surface (see FIGS. 9 through 12), the anterior side 40 will rest significantly on the lifting cams 58.

As the principal rear frame members 22 of the posterior frame 20 rests on the ground surface, the user will manually move the principal rear frame members 22 about four feet away from the trailer frame 12. Such movement will cause the lifting cams 58 to move away from the straight rods 50a, 50b of the anterior frame 40. The locking pins 65 of the rollover lock joints 60 of the anterior frame 40 are then removed, and the basal frontal frame member 44 drops downward (see FIGS. 11 and 12), and the surveillance platform 18 will come to rest against the posterior frame 20. The disconnect pin 64 is removed from the principal front frame member 44 to separate the surveillance platform 18 from the anterior frame 40, and the basal frontal frame member 44 of the anterior frame 40 comes to rest on the trailer frame 12. The principal frontal frame member 42 is then pivoted via the rollover lock joints 60 to also fold down onto the trailer frame 12.

Once the anterior frame 40 is laid onto the trailer frame 12, the principal rear frame member 22 and the basal rear frame member 24 of the posterior frame 20 are folded together about the rollover lock joint 60 of the posterior frame 20. The folded posterior frame 20 is then pivoted about the pivot points 59 connected to the trailer frame 12 to bring the posterior frame 20 to rest upon the trailer frame 12 as well (see FIG. 4).

It should further be noted that the observation platform assembly 10, when elevated, may reach a height of over fourteen feet. However, when retracted, the observation platform assembly 10 only rises approximately four feet off of the ground surface. Moreover, fixed arms 26a, 26b, 46a, and 46b could be removable, or folded down, to further reduce the collapsed height to less than two feet. The observation platform assembly 10 may then act as a conventional trailer to support and move heavy cargo.

In conclusion, the observation platform assembly 10 is designed such that an ordinary user may reposition the heavy observation platform assembly 10 alone, and a knowledgeable user can reposition the observation platform assembly 10 to extend or retract quickly within approximately five minutes. Furthermore, it should be noted that the observation platform assembly 10 additionally includes various means for protecting the user when in the elevated position. First, a chair 17 (see FIG. 1) is easily attachable to the surveillance platform 18 to allow the desired comfort and safety of the user when on the surveillance platform 18. Second, the L-shaped arms 26a, 26b, 46a, 46b and the support beams 28, 48 act as security rails for the user to keep the user on the surveillance platform 18.

Variations of the preferred embodiment of the observation platform assembly 10 may also be designed. For example, although not shown in the figures, the observation platform assembly 10 may include one or more reinforcement plates that are slidably positioned within the base platform 12 or pivotally affixed to the base platform 12. The reinforcement plates could be affixed to any side of the base platform 12 such that they would act as ramps to aid the user in positioning heavy machinery (such as an ATV) on the base platform 12. Furthermore, these reinforcement plates could also provide a stable flooring for the user to be able to easily walk on the base platform 12.

Thus, although there have been described particular embodiments of the present invention of a new and useful MOBILE OBSERVATION PLATFORM ASSEMBLY, it is not intended that such references be construed as limitations upon the scope of this invention except as set forth in the following claims.

What is claimed is:

1. An articulated observation platform assembly positionable between an extended position and a retracted position, said assembly comprising:
    a base having a proximal side and a distal side;
    a collapsible anterior frame attached to said proximal side of said base, said interior frame including
        a basal frontal frame member comprising two support rods joined by a first connecting brace, each support rod having a subjacent end and a superjacent end, wherein said subjacent end of each said support rod is pivotally connected to said proximal side of said base;
        a principal frontal frame member comprising two L-shaped arms joined by a second connecting brace, each L-shaped arm having a first end and a second end, wherein said first end of each said L-shaped arm is pivotally connected to said superjacent end of one said support rod;
    a collapsible posterior frame attached to said distal side of said base;
    a pair of leverage cams attached to said collapsible posterior frame, wherein said leverage cams engage said anterior frame when said posterior frame is moved between the extended position and the retracted position; and
    an observation platform pivotally attached to said posterior frame, wherein said observation platform is connected to said anterior frame when said assembly is in the extended position.

2. The assembly as described in claim 1 wherein said anterior frame further comprises a pair of rollover lock joints connected between each said support rod and L-shaped arm.

3. The assembly as described in claim 1 further comprising a pair of support braces connected between said support rods of said basal frontal frame member of said anterior frame.

4. The assembly as described in claim 1 wherein said posterior frame comprises:
    a basal rear frame member comprising two support rods, each support rod having a subjacent end and a superjacent end, wherein said subjacent end of each said support rod is pivotally connected to said distal side of said base;
    a principal rear frame member comprising two L-shaped arms, each L-shaped arm having a first end and a second end, wherein said first end of each said L-shaped arm is pivotally connected to said superjacent end of one said support rod, wherein each said leverage cam is connected to one of said L-shaped arms.

5. The assembly as described in claim 4 wherein said posterior frame further comprises a pair of rollover lock joints connected between each said support rod and L-shaped arm.

6. The assembly as described in claim 1 wherein said posterior frame further comprises a ladder.

7. The assembly as described in claim 6 wherein said platform includes a recession.

8. The assembly as described in claim 1 further comprising a pair of auxiliary braces connected between said anterior frame and said posterior frame.

9. The assembly as described in claim 1 further comprising:
- an axle rotatably connected to said base, said axle having a first end and a second end;
- a first wheel attached to said first end of said axle; and
- a second wheel attached to said second end of said axle.

10. A method for retracting an observation stand assembly comprising the steps of:
- a. providing an anterior frame having a centrally located joint separating a basal frontal frame member and a principal frontal frame member, said basal frontal frame member being substantially aligned with said principal frontal frame member, and said basal frontal frame member being connected to a proximal side of a base;
- b. providing a posterior frame having a centrally located joint separating a basal rear frame member and a principal rear frame member, said basal rear frame member being substantially aligned with said principal rear frame member, and said basal rear frame member being connected to a distal side of said base;
- c. providing a pair of leveraging cams attached to said principal rear frame member;
- d. disconnecting said principal frontal frame member from said principal rear frame member;
- e. pivoting said posterior frame such that said principal rear frame member is unaligned with said basal rear frame member;
- f. engaging said anterior frame with said leveraging cams;
- g. pivoting said anterior frame such that said principal frontal frame member is unaligned with said basal frontal frame member; and
- h. cooperatively lowering said anterior frame and said posterior frame onto said base.

11. The method as described in claim 10 wherein, after step e, further comprising the step of:
- removing a locking pin from said joint of said posterior frame to allow pivotal movement of said principal rear frame member and said basal rear frame member.

12. The method as described in claim 10 wherein, after step f, further comprising the step of:
- removing a locking pin from said joint of said anterior frame to allow pivotal movement of said principal frontal frame member and said basal frontal frame member.

13. An observation stand assembly collapsible from an extended position to a retracted position, said assembly comprising:
- a base having a proximal side and a distal side;
- a basal rear frame member having a subjacent end and a superjacent end, wherein said subjacent end of said basal rear frame is connected to said distal side of said base;
- a principal rear frame member having a junior end and a senior end, wherein said junior end of said principal rear frame member is pivotally connected to said superjacent end of said basal rear frame member;
- a first pair of rollover lock joints connected between said basal rear frame member and said principal rear frame member;
- a basal frontal frame member having a subjacent end and a superjacent end, wherein said subjacent end of said basal frontal frame is connected to said proximal side of said base;
- a principal frontal frame member having a junior end and a senior end, wherein said junior end of said principal frontal frame member is pivotally connected to said superjacent end of said basal frontal frame member;
- a second pair of rollover lock joints connected between said basal frontal frame member and said principal frontal frame member; and
- a pair of lifting cams attached to said principal rear frame member, each lifting cam positioned on said principal rear frame member to engage said principal frontal frame member and said basal frontal frame member during repositioning of said observation stand assembly.

14. The assembly as described in claim 13 wherein said basal frontal frame member comprises a first frontal support rod, a second frontal support rod, and a frontal support brace connecting said first frontal support rod with said second frontal support rod;
- wherein said principal frontal frame member comprises a first frontal L-shaped arm, a second frontal L-shaped arm, and a frontal support brace connecting said first frontal L-shaped arm with said second frontal L-shaped arm; and
- wherein said first frontal support rod is pivotally connected to said first frontal L-shaped arm, and said second frontal support rod is pivotally connected to said second frontal L-shaped arm.

15. The assembly as described in claim 13 wherein said basal rear frame member comprises a first rear support rod, a second rear support rod, and a rear support brace connecting said first rear support rod with said second rear support rod;
- wherein said principal rear frame member comprises a first rear L-shaped arm, a second rear L-shaped arm, and a rear support brace connecting said first rear L-shaped arm with said second rear L-shaped arm; and
- wherein said first frontal support rod is pivotally connected to said first frontal L-shaped arm, and said second frontal support rod is pivotally connected to said second frontal L-shaped arm.

16. The assembly as described in claim 13 further comprising a platform pivotally connected to said principal rear frame member and disconnectedly attached to principal frontal frame member.

17. The assembly as described in claim 13 further comprising:
- a series of rungs attached to said basal rear frame member and said principal rear frame member; and
- a recess through said platform.

18. The assembly as described in claim 13 wherein said base is attached to an axle and wheel assembly for the movement of said assembly.

* * * * *